(12) United States Patent
Takase et al.

(10) Patent No.: US 12,276,465 B2
(45) Date of Patent: Apr. 15, 2025

(54) HEAT PUMP AND HEAT PUMP UNIT USING SAME

(71) Applicant: TOYO ENGINEERING CORPORATION, Tokyo (JP)

(72) Inventors: Hiroshi Takase, Narashino (JP); Masaki Togo, Narashino (JP); Toshihiro Wakabayashi, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 182 days.

(21) Appl. No.: 18/033,150

(22) PCT Filed: Oct. 14, 2021

(86) PCT No.: PCT/JP2021/038093
§ 371 (c)(1),
(2) Date: Apr. 21, 2023

(87) PCT Pub. No.: WO2022/085567
PCT Pub. Date: Apr. 28, 2022

(65) Prior Publication Data
US 2023/0392884 A1 Dec. 7, 2023

(30) Foreign Application Priority Data
Oct. 23, 2020 (JP) .................................. 2020-178282

(51) Int. Cl.
*F28F 23/00* (2006.01)
*C09K 5/04* (2006.01)

(52) U.S. Cl.
CPC .............. *F28F 23/00* (2013.01); *C09K 5/047* (2013.01)

(58) Field of Classification Search
CPC .......... F28F 23/00; C09K 5/047; F25B 21/00; F25B 2321/0021; F25B 2321/002
(Continued)

(56) References Cited

U.S. PATENT DOCUMENTS 5,444,983 A * 8/1995 Howard ................. F25B 21/00
62/3.1
9,173,415 B2 * 11/2015 Meillan .................. F25B 21/00
(Continued)

FOREIGN PATENT DOCUMENTS

JP 59-217464 A 12/1984
JP 2006-512557 A 4/2006
(Continued)

OTHER PUBLICATIONS

International Search Report & Written Opinion issued in PCT Application No. PCT/JP2021/038093, mailed Dec. 14, 2021 (6 pages).

Primary Examiner — Jon T. Schermerhorn, Jr.
(74) Attorney, Agent, or Firm — Foley & Lardner LLP

(57) ABSTRACT

Heat pump 10 has heat-absorbing section 12 that receives heat from an outside and heat-releasing section 13 that releases heat to the outside, for transferring heat between heat-absorbing section 12 and heat-releasing sectioning 13 by reinforcing and reducing a magnetic field applied to a primary working fluid circulating between heat-absorbing section 12 and heat-releasing section 13, wherein the primary working fluid is magnetic particle dispersion 11 containing magnetic particles 11 dispersed in a dispersion medium.

6 Claims, 5 Drawing Sheets

(58) Field of Classification Search
USPC .................................................. 165/104.13
See application file for complete search history.

(56) References Cited

U.S. PATENT DOCUMENTS

| | | | |
|---|---|---|---|
| 9,797,630 B2* | 10/2017 | Benedict | ................. F25B 21/00 |
| 9,915,448 B2* | 3/2018 | Benedict | ................. F25B 21/00 |
| 9,976,814 B2* | 5/2018 | Gomez | ................... F28F 13/06 |
| 9,983,259 B2* | 5/2018 | Wu | ........................ G05D 23/19 |
| 10,378,798 B2* | 8/2019 | Hurbi | ...................... G06F 3/011 |
| 11,561,032 B2* | 1/2023 | Linares | ................... F25B 21/00 |
| 12,055,324 B2* | 8/2024 | Takase | .................... F25B 21/00 |
| 2005/0160752 A1* | 7/2005 | Ghoshal | ................. H10N 10/00 |
| | | | 62/118 |
| 2007/0068172 A1 | 3/2007 | Lee | |
| 2008/0264068 A1* | 10/2008 | Nakasuka | ............... F28F 23/00 |
| | | | 62/3.3 |
| 2019/0257555 A1* | 8/2019 | Rowe | ..................... F25B 21/00 |

FOREIGN PATENT DOCUMENTS

| | | |
|---|---|---|
| JP | 2012-229634 A | 11/2012 |
| JP | 2019-509461 A | 4/2019 |
| KR | 10-2005-0048142 A | 5/2005 |

\* cited by examiner

HEAT PUMP AND HEAT PUMP UNIT USING SAME

CROSS-REFERENCE TO RELATED APPLICATIONS

This application is a U.S. National Stage of International Patent Application No. PCT/JP2021/038093, filed Oct. 14, 2021, which claims priority to Japanese Patent Application No. 2020-178282, filed Oct. 23, 2020.

TECHNICAL FIELD

The present invention relates to a heat pump and a heat pump unit using the same, and particularly to a heat pump that uses a magnetic field to transfer heat and a heat pump unit using the same.

BACKGROUND ART

Conventionally, heat pumps have been used as a means of transferring heat from a low-temperature section to a high-temperature section. The heat pump receives heat from the low-temperature section and then raises the temperature of this heat to supply it to the high-temperature section, so that it can obtain high-temperature heat energy from low-temperature heat energy.

As such heat pumps, mechanical heat pumps with compressors have been commercialized. However, in heat pumps with compressors, noise caused by the compressor and complicated maintenance are recognized as problems and risks.

For example, Patent Literature 1 discloses a heat pump that uses a magnetic field to transfer heat. The heat pump disclosed in Patent Literature 1 includes particulate magnetic solids filled inside the device, and causes a magnetic field to be applied to or removing from the magnetic solids to exchange heat between the magnetic solids and a liquid working fluid flowing through a packed bed filled with the magnetic solids. This means that compared to heat pumps with compressors, noise caused by the compressor is not generated, and maintenance is easier.

CITATION LIST

Patent Literature

Patent Literature 1: JP 2019-509461 A

SUMMARY OF THE INVENTION

Technical Problem

In the heat exchange between the magnetic substances and the working fluid as described above, if the overall heat transfer coefficient depending on the condition of the heat transfer surface is U, the heat transfer area is A, and the temperature difference between the heat transfer surfaces is $\Delta t$, then the heat quantity Q to be exchanged is expressed as follows:

$$Q = U \cdot A \cdot \Delta t.$$

Therefore, to obtain a large heat quantity Q, the heat transfer area A and/or the temperature difference $\Delta t$ between the heat transfer surfaces must be increased. To increase the heat transfer area A, it is necessary to increase the volume specific surface area by reducing the size of the magnetic particles. However, as disclosed in Patent Literature 1, in the heat pump that exchanges heat between the magnetic particles filled inside the device and the liquid working fluid, if the size of the magnetic particles is reduced, the pressure drop when the liquid working fluid flows through the packed bed increases. In this case, the work required to move the working fluid is increased, and the heat pump efficiency is reduced. Therefore, to obtain good efficiency, magnetic particles of relatively large size must be used. As a result, the area of contact between the magnetic substances in solid form and the liquid working fluid (i.e. the heat transfer area A) is limited.

On the other hand, to obtain a large heat quantity Q, the temperature difference $\Delta t$ between the heat transfer surfaces may be increased. However, the heat pump has a problem that if the temperature difference $\Delta t$ between the heat transfer surfaces is large, it is necessary to raise and lower the temperature of the working fluid extra for the temperature difference, resulting in a decrease in thermal efficiency.

The present invention has been made in view of the above problems of the prior art, and its object is to provide a heat pump that uses a magnetic field so that heat can be transferred with high efficiency, and a heat pump unit using the same.

Solution to Problem

To achieve the above objective, the present invention is a heat pump having a heat-absorbing section that receives heat from an outside and a heat-releasing section that releases heat to the outside, for transferring heat between the heat-absorbing section and the heat-releasing section by reinforcing and reducing a magnetic field applied to a primary working fluid circulating between the heat-absorbing section and the heat-releasing section, wherein the primary working fluid is a fluid containing magnetic particles dispersed in a dispersion medium.

The fluid may be a colloidal fluid or a suspension. In the following description, both cases where it is a colloidal fluid and where it is a suspension are collectively referred to as a magnetic particle dispersion.

In the present invention configured as described above, when reinforcing and reducing a magnetic field applied to the primary working fluid circulating between the heat-absorbing section that receives heat from the outside and the heat-releasing section that releases heat to the outside, the magnetic moments and entropy of the magnetic particles constituting the primary working fluid are changed to cause heat absorption, heat release, temperature rise, and temperature drop. In this case, since the primary working fluid is a magnetic particle dispersion which is a colloidal fluid containing magnetic particles dispersed in a dispersion medium, the size of magnetic particles in the primary working fluid is very small. Therefore, the heat transfer area between the magnetic particles and the dispersion medium is extremely large, which improves the efficiency of heat exchange between the magnetic particles and the dispersion medium of the primary working fluid, resulting in highly efficient heat transfer.

Further, if it includes a temperature-rising section in which the magnetic field applied to the primary working fluid that has passed through the heat-absorbing section is reinforced in an adiabatic environment and a temperature-dropping section in which the magnetic field applied to the primary working fluid that has passed through the heat-releasing section is reduced in an adiabatic environment, wherein the heat-absorbing section holds the primary working fluid that has passed through the temperature-rising section, with the magnetic field reduced, and wherein the heat-releasing section holds the primary working fluid that has passed through the temperature-rising section, with the magnetic field reinforced, heat can be transferred using the cycle based on the magnetocaloric effect.

Further, if a source of the magnetic field is a permanent magnet, the magnetic field is generated without the need for a power source.

In a heat pump unit using the above heat pump, if the heat pump is arranged in multiple stages such that the heat-absorbing section of the heat pump in a succeeding stage receives heat released in the heat-releasing section of the heat pump in a preceding stage, and the heat pump unit includes a heat-transfer assisting section that is arranged between the multiple stages of heat pumps and that receives heat released in the heat-releasing section of the heat pump in the preceding stage with a secondary working fluid and then gives the heat of the secondary working fluid to the heat-absorbing section of the heat pump in the succeeding stage, thermal energy can be transferred with a large temperature difference.

Further, in each of the multiple stages of heat pumps, if a magnetic material constituting the primary working fluid is individually selected depending on temperatures of heat to be absorbed in the heat-absorbing section and heat to be released in the heat-releasing section of each heat pump, the overall thermal efficiency is improved.

Further, if the secondary working fluid flows through a common channel with the primary working fluid that receives and gives heat, and if one of the primary working fluid and the secondary working fluid that flow through the common channel is hydrophilic and another is hydrophobic, the heat transfer resistance between the primary working fluid and the secondary working fluid is reduced to allow more efficient heat exchange, yet the primary working fluid and the secondary working fluid can be easily separated from each other after the heat exchange between them.

Advantageous Effects of Invention

According to the present invention, since the primary working fluid circulating between the heat-absorbing section that receives heat from the outside and the heat-releasing section that releases heat to the outside is a magnetic particle dispersion containing magnetic particles dispersed in a dispersion medium, the efficiency of heat exchange between the magnetic particles and the dispersion medium of the primary working fluid is improved, enabling highly efficient heat transfer using the magnetic field.

Further, in the heat pump including the temperature-rising section in which the magnetic field applied to the primary working fluid that has passed through the heat-absorbing section is reinforced in an adiabatic environment and the temperature-dropping section in which the magnetic field applied to the primary working fluid that has passed through the heat-releasing section is reduced in an adiabatic environment, wherein the heat-absorbing section holds the primary working fluid that has passed through the temperature-rising section, with the magnetic field reduced, and wherein the heat-releasing section holds the primary working fluid that has passed through the temperature-rising section, with the magnetic field reinforced, heat can be transferred using the cycle based on the magnetocaloric effect.

Further, in the heat pump wherein the source of the magnetic field is a permanent magnet, the magnetic field can be generated without the need for a power source.

Further, in the heat pump using with the heat pump, wherein the heat pump is arranged in multiple stages such that the heat-absorbing section of the heat pump in the succeeding stage receives heat released in the heat-releasing section of the heat pump in the preceding stage, and wherein the heat pump unit includes the heat-transfer assisting section that is arranged between the multiple stages of heat pumps and that receives heat released in the heat-releasing section of the heat pump in the preceding stage with a secondary working fluid and then gives the heat of the secondary working fluid to the heat-absorbing section of the heat pump in the succeeding stage, thermal energy can be transferred with a large temperature difference.

Further, in the heat pump unit wherein in each heat pump of the plurality of heat pumps, the magnetic material constituting the primary working fluid is individually selected depending on the temperatures of heat to be absorbed in the heat-absorbing section and heat to be released in the heat-releasing section of each heat pump, the overall thermal efficiency can be improved.

In the heat pump unit wherein the secondary working fluid flows through the common channel with the primary working fluid that receives and gives heat, and if one of the primary working fluid and the secondary working fluid that flow through the common channel is hydrophilic and the another is hydrophobic, the heat transfer resistance between the primary working fluid and the secondary working fluid is reduced to allow more efficient heat exchange, yet the primary working fluid and the secondary working fluid can be easily separated from each other after the heat exchange between them.

DESCRIPTION OF EMBODIMENTS

An embodiment of the present invention will be described below with reference to the drawings.

Figure 1:
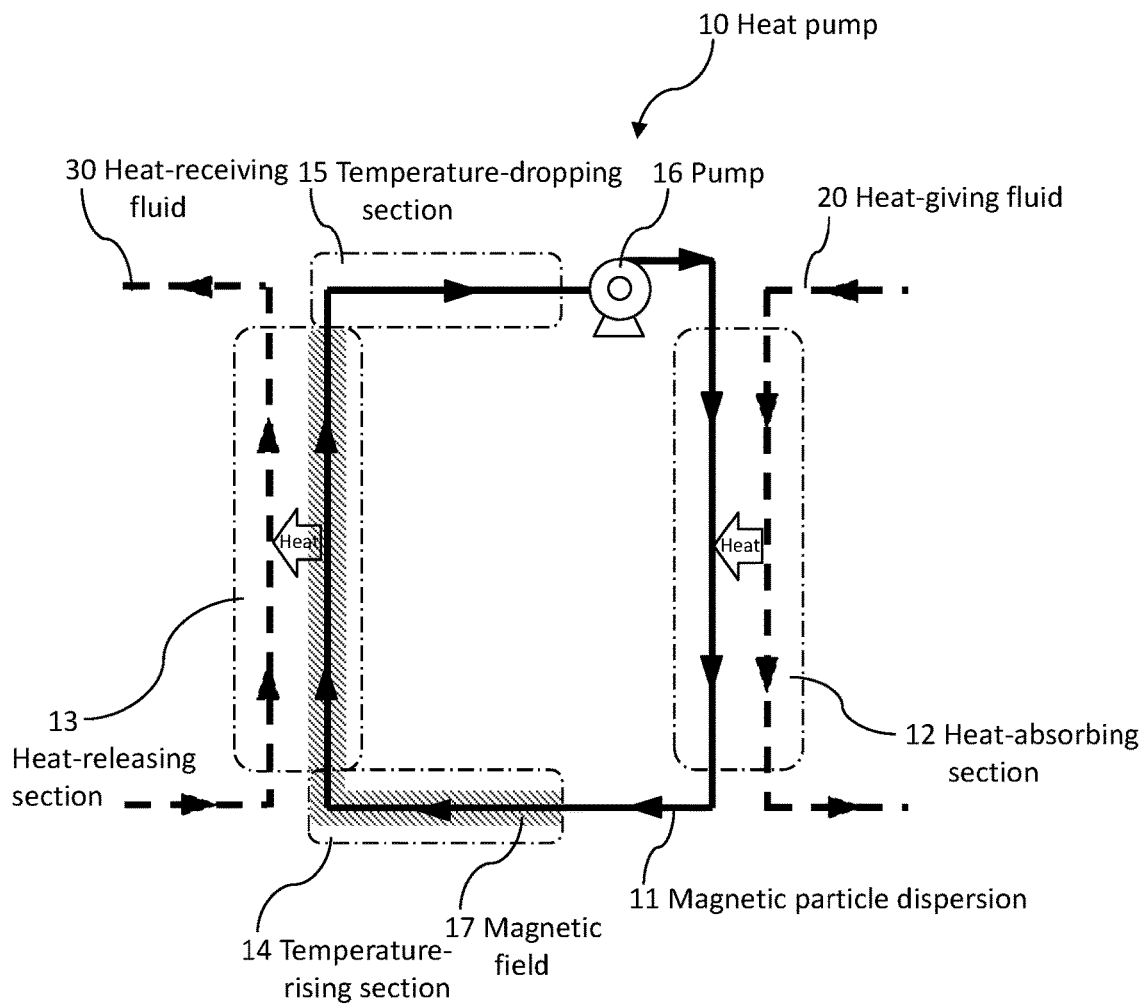
FIG. 1 shows a heat pump according to an embodiment of the present invention.

FIG. 1 shows a heat pump according to an embodiment of the present invention.

As shown in FIG. 1, the heat pump according to this embodiment receives heat from heat-giving fluid 20 and releases heat to heat-receiving fluid 30 by means of magnetic particle dispersion 11 circulating through a channel. The channel for magnetic particle dispersion 11 is provided with heat-absorbing section 12, temperature-rising section 14, heat-releasing section 13, temperature-dropping section and pump 16.

Heat-absorbing section 12 is located close to a channel through which heat-giving fluid 20 flows. Heat-absorbing section 12 causes magnetic particle dispersion 11 to receive heat from heat-giving fluid 20.

Temperature-rising section 14 is located downstream of heat-absorbing section 12 in the flow direction of magnetic particle dispersion 11. Temperature-rising section 14 causes the temperature of magnetic particle dispersion 11 that has received heat in heat-absorbing section 12 to rise.

Heat-releasing section 13 is located close to a channel through which heat-receiving fluid 30 flows and downstream of temperature-rising section 14 in the flow direction of magnetic particle dispersion 11. Heat-releasing section 13 causes magnetic particle dispersion 11 to release heat to heat-receiving fluid 30.

Temperature-dropping section 15 is located downstream of heat-releasing section 13 in the flow direction of magnetic particle dispersion 11. Temperature-dropping section 15 causes the temperature of magnetic particle dispersion 11 that has released heat in heat-releasing section 13 to drop.

Pump 16 is located between temperature-dropping section 15 and heat-absorbing section 12 in the channel for magnetic particle dispersion 11. Pump 16 circulates magnetic particle dispersion 11 through the channel. The location of pump 16 is not limited to a location between temperature-dropping section 15 and heat-absorbing section 12, as long as it can circulate magnetic particle dispersion 11 through the channel.

Figure 2:
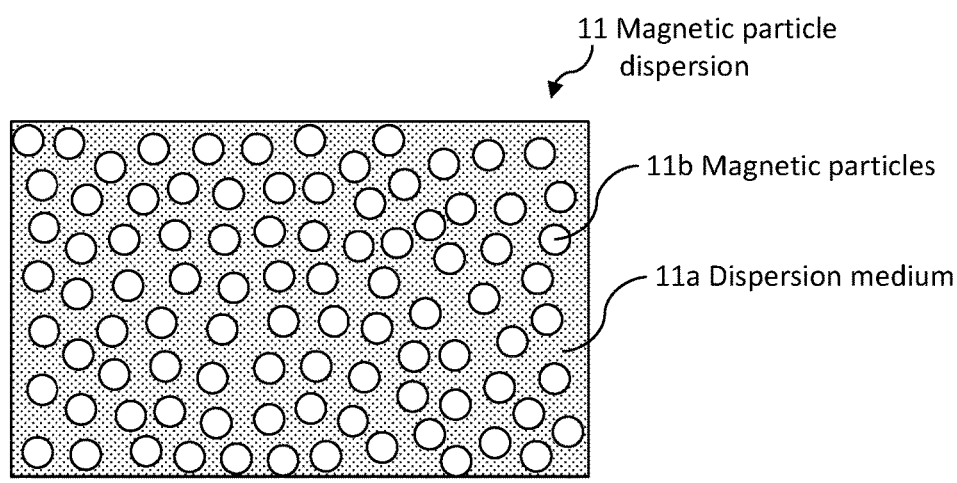
FIG. 2 shows the configuration of a magnetic particle dispersion shown in FIG. 1.

FIG. 2 shows the configuration of magnetic particle dispersion 11 shown in FIG. 1.

Magnetic particle dispersion 11 shown in FIG. 1 is a primary working fluid in the present invention. As shown in FIG. 2, magnetic particle dispersion 11 is a fluid containing magnetic particles 11$b$, which are fine particles of magnetic material, dispersed in dispersion medium 11$a$.

The characteristics of magnetic particles 11$b$ will be described here.

When magnetic substances, such as magnetic particles 11$b$, are placed in an environment where a magnetic field exists, the magnetic moments of the magnetic substances are aligned along the direction of the magnetic field. Then, if the magnetic field in the environment is reduced, the magnetic moments of the magnetic substances will point in different directions accordingly. Thus, the magnetic substances become "disordered", which leads to an increase in their magnetic entropy.

When this process takes place in an adiabatic environment, the temperature of the magnetic substances drops according to the change in magnetic moments.

On the other hand, if a magnetic field is reinforced while magnetic substances are placed in an environment with a reduced magnetic field, the magnetic moments of the magnetic substances will point in the direction of the magnetic field accordingly. Thus, the magnetic substances become "ordered", which leads to a decrease in their magnetic entropy.

When this process takes place in an adiabatic environment, the temperature of the magnetic substances rises according to the change in magnetic moments.

Heat pump 10 shown in FIG. 1 takes advantage of the cycle based on the magnetocaloric effect of magnetic particles 11$b$ as described above to receive heat from heat-giving fluid 20 and release heat to heat-receiving fluid 30.

The specific operation of heat pump 10 shown in FIG. 1 will be described below.

Figure 3:
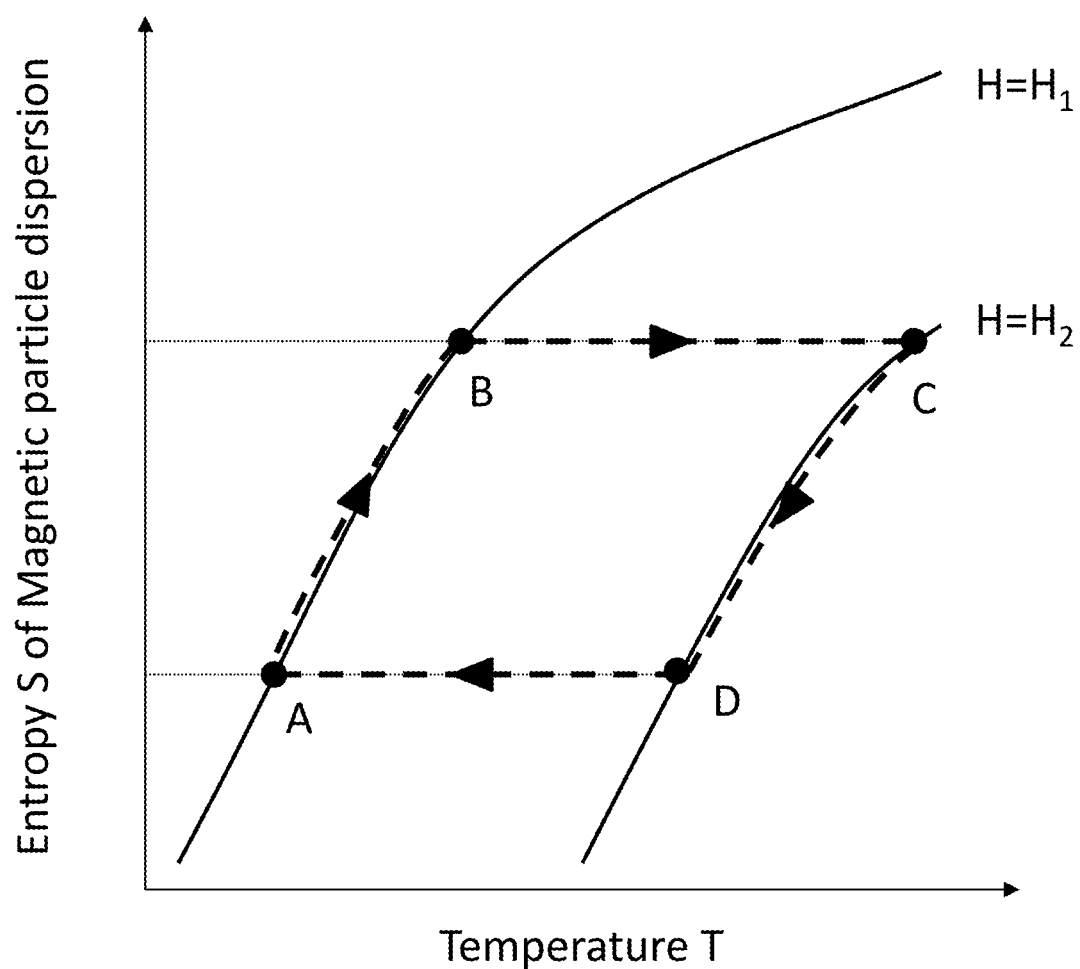
FIG. 3 illustrates the specific operation of the heat pump shown in FIG. 1.

FIG. 3 illustrates the specific operation of heat pump 10 shown in FIG. 1. FIG. 3 shows the cycle characteristics of magnetic particles 11$b$ based on the magnetocaloric effect. Note that H indicates the strength of the magnetic field, and H1<H2.

In heat-absorbing section 12, heat is transferred from heat-giving fluid 20 to magnetic particle dispersion 11 while a magnetic field applied to magnetic particle dispersion 11 is not reinforced. This causes the entropy S of magnetic particle dispersion 11 to increase, whereby the characteristic point in FIG. 3 moves from point A to point B. Here, the temperature change profile from point A to point B depends both on the magnetocaloric effect of magnetic particles 11$b$ and on the heat transfer between magnetic particle dispersion 11 and heat-giving fluid 20. The strength of the magnetic field may be changed while moving from point A to point B. Then, the temperature change profile varies depending on how the magnetic field is changed.

Magnetic particle dispersion 11 that has received heat from heat-giving fluid 20 in heat-absorbing section 12, flows through the channel to be supplied to temperature-rising section 14. In temperature-rising section 14, magnetic field 17 applied to magnetic particle dispersion 11 that has passed through heat-absorbing section 12 is reinforced. This causes the magnetic moments of magnetic particles 11$b$ to change, whereby the characteristic point in FIG. 3 moves from point B to point C. In this case, since the magnetic moments are changed in an adiabatic environment, the temperature T of magnetic particle dispersion 11 rises.

Magnetic particle dispersion 11 whose temperature has been raised in temperature-rising section 14, flows through the channel to be supplied to heat-releasing section 13. In heat-releasing section 13, magnetic field 17 applied to magnetic particle dispersion 11 that has passed through temperature-rising section 14 is kept reinforced. This causes the entropy of magnetic particle dispersion 11 to decrease, whereby the characteristic point in FIG. 3 moves from point C to point D. In this case, magnetic particle dispersion 11 releases heat to heat-receiving fluid 30 in response to the decrease in entropy and temperature of magnetic particle dispersion 11. For this case, since heat-releasing section 13 is located downstream of temperature-rising section 14 in the flow direction of magnetic particle dispersion 11, the temperature of heat transferred to heat-receiving fluid 30 in heat-releasing section 13 is higher than the temperature of heat transferred from heat-giving fluid 20 in heat-absorbing section 12. The temperature change profile from point C to point D depends both on the magnetocaloric effect of magnetic particles 11$b$ and the heat transfer between magnetic particle dispersion 11 and heat-receiving fluid 30. The strength of the magnetic field may be changed while moving from point C to point D. Then, the temperature change profile varies depending on how the magnetic field is changed.

Magnetic particle dispersion 11 that has released heat to heat-receiving fluid 30 in heat-releasing section 13, flows through the channel to be supplied to temperature-dropping section 15. In temperature-dropping section 15, magnetic field 17 applied to magnetic particle dispersion 11, that has been reinforced when having passed through heat-releasing section 13, is reduced. This causes the magnetic moments of magnetic particle 11$b$ to change, whereby the characteristic point in FIG. 3 moves from point D to point A. In this case, since the magnetic moments are changed in an adiabatic environment, the temperature T of magnetic particle dispersion 11 drops. As a result, the temperature of magnetic particle dispersion 11 supplied to heat-absorbing section 12 after passage through temperature-dropping section 15 is lower than the temperature of magnetic particle dispersion 11 supplied to temperature-rising section 14 after passage through heat-absorbing section 12.

Since magnetic particle dispersion 11 circulates through the channel as described above, it receives heat at lower temperatures and releases heat at higher temperatures.

Thus, heat pump 10 shown in FIG. 1 functions as a heat pump that uses the magnetocaloric effect to receive heat from heat-giving fluid 20 and release heat to heat-receiving fluid 30.

A permanent magnet or an electromagnet is a possible source of magnetic field 17, and in heat pump 10 shown in FIG. 1, a permanent magnet is more preferably used in view of the fact that no power source is required.

The effect of using magnetic particle dispersion 11 in heat pump 10 shown in FIG. 1 will be described below.

Figure 4A:
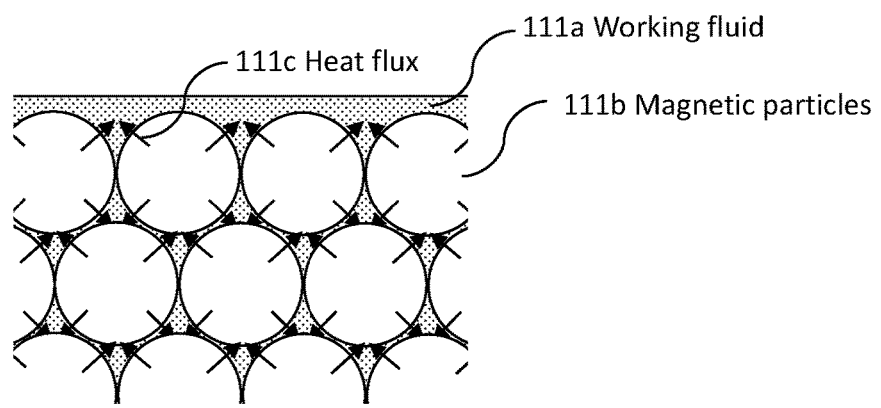
FIG. 4A shows the heat transfer effect in a conventional configuration to illustrate the effect of using magnetic particle dispersion in the heat pump shown in FIG. 1.

FIG. 4A shows the heat transfer effect in a conventional configuration to illustrate the effect of using magnetic particle dispersion 11 in heat pump 10 shown in FIG. 1.

Figure 4B:
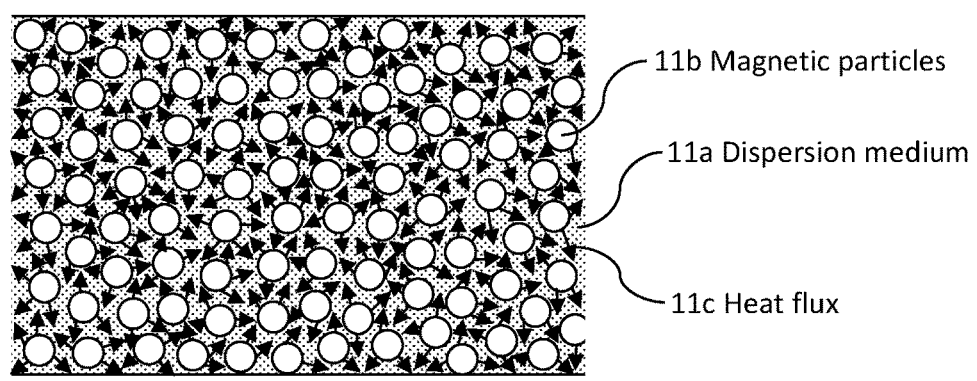
FIG. 4B shows the heat transfer effect in the heat pump shown in FIG. 1.

FIG. 4B shows the heat transfer effect in heat pump 10 shown in FIG. 1.

As shown in FIG. 4Aa, in the heat pump disclosed in Patent Literature 1, when a magnetic field is applied while liquid working fluid 111a is in contact with magnetic particles 111b filled inside the device, heat flux 111c is transferred from magnetic particles 111b to liquid working fluid 111a. If the size of magnetic particles 111b is reduced, the heat pump efficiency will decrease because the pressure drop of working fluid 111a is increased. Therefore, magnetic particles 111b must be relatively large in size to prevent loss of heat efficiency. As a result, the heat transfer area formed by contact between magnetic substances 111b and liquid working fluid 111a is reduced, and heat flux 111c generated in magnetic substances 111b is not efficiently transferred to working fluid 111a.

On the other hand, in heat pump 10 shown in FIG. 1, magnetic particle dispersion 11, which is a colloidal fluid containing magnetic particles 11b dispersed in dispersion medium 11a, is used as the working fluid, as described above. Therefore, as shown in FIG. 4B, magnetic particles 11b are very small in size. As a result, the heat transfer area between magnetic particles 11b and dispersion medium 11a is extremely large. This improves the efficiency of heat exchange between magnetic particles 11b and dispersion medium 11a, whereby heat flux 11c is transferred with high efficiency.

Thus, in this embodiment, the primary working fluid circulating between heat-absorbing section 12 that receives heat from heat-giving fluid 20 and heat-releasing section 13 that releases heat to heat-receiving fluid 30 is magnetic particle dispersion 11 which is a colloidal fluid containing magnetic particles 11b dispersed in dispersion medium 11a, and therefore the efficiency of heat exchange between magnetic particles 11b and dispersion medium 11a is improved, enabling highly efficient heat transfer using the magnetic field.

A configuration will be described here in which heat energy is transferred with an even larger temperature difference by means of heat pump 10 described above.

Figure 5:
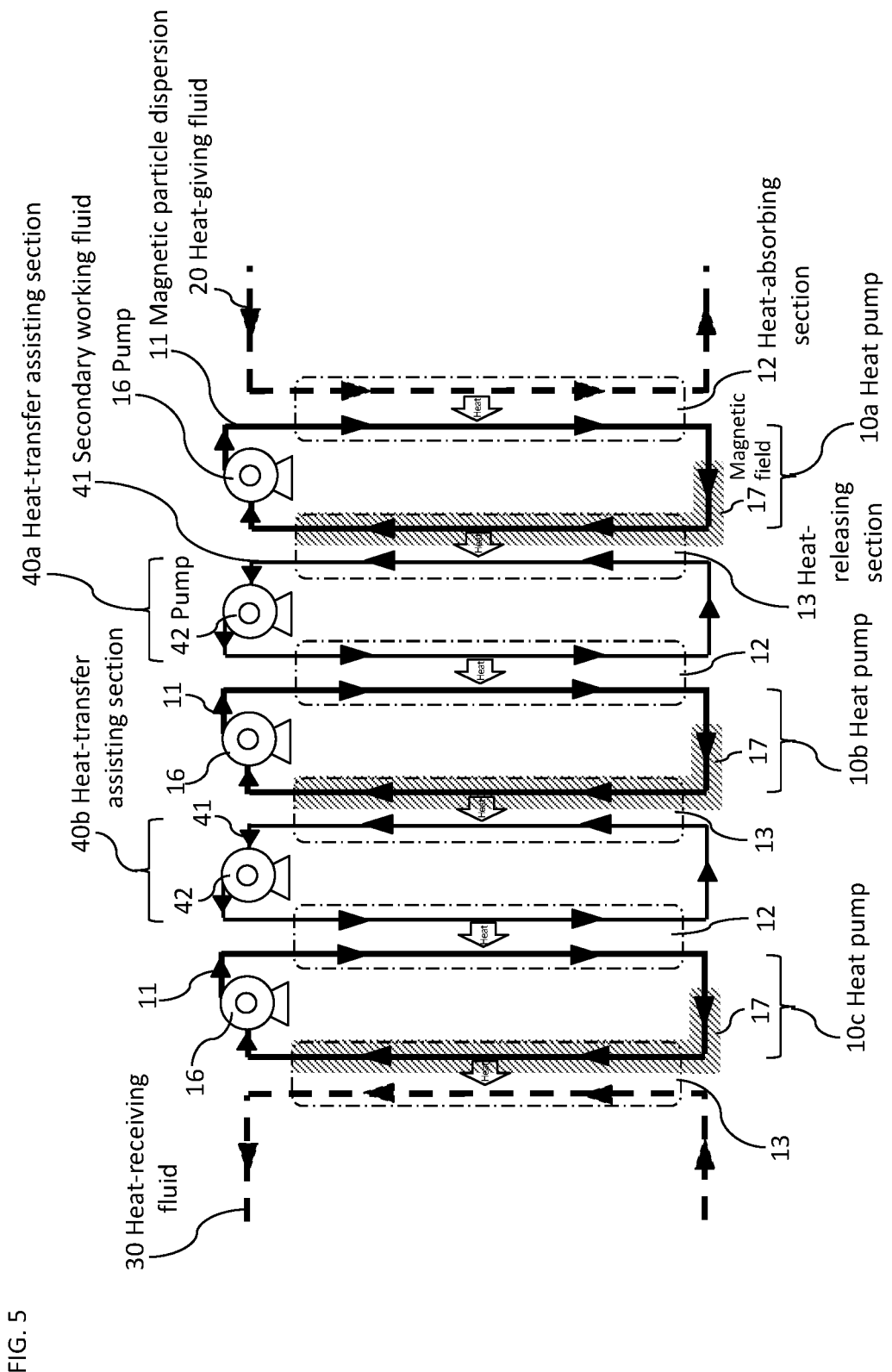
FIG. 5 shows a heat pump unit that transfers thermal energy with an even larger temperature difference by means of the heat pump shown in FIG. 1.

FIG. 5 shows an exemplary configuration of a heat pump unit that transfers thermal energy with an even larger temperature difference by means of heat pump 10 shown in FIG. 1.

As shown in FIG. 5, this exemplary configuration includes three heat pumps 10a-10c each having the same configuration as heat pump 10 shown in FIG. 1, and heat-transfer assisting sections 40a, 40b each located between two heat pumps 10a-10c. These three heat pumps 10a-10c and two heat-transfer assisting sections 40a, 40b are arranged as follows: heat pump 10a, heat-transfer assisting section 40a, heat pump heat-transfer assisting section 40b, and heat pump 10c are arranged in this order from a side of the channel through which heat-giving fluid 20 flows, i.e. heat pump 10c is located closest to the channel through which heat-receiving fluid 30 flows. In each of heat-transfer assisting sections 40a, 40b, pump 42 causes secondary working fluid 41 to flows through a channel.

In the heat pump unit configured as described above, heat is first transferred from heat-giving fluid 20 to magnetic particle dispersion 11 in heat-absorbing section 12 of heat pump 10a, the temperature of magnetic particle dispersion 11 rises, and then heat is released from magnetic particle dispersion 11 in heat-releasing section 13 of heat pump 10a. The heat released in heat-releasing section 13 of heat pump 10a is transferred to secondary working fluid 41 of heat-transfer assisting section 40a located between heat pumps 10a, 10b. This heat is then transferred to magnetic particle dispersion 11 in heat-absorbing section 12 of heat pump 10b.

Next, the temperature of magnetic particle dispersion 11, to which heat has been transferred in heat-absorbing section 12 of heat pump 10b, rises in heat pump 10b, and thereafter heat is released in heat-releasing section 13 of heat pump 10b. The heat released in heat-releasing section 13 of heat pump 10b is transferred to secondary working fluid 41 of heat-transfer assisting section 40b located between heat pumps 10b, 10c. This heat is then transferred to magnetic particle dispersion 11 in heat-absorbing section 12 of heat pump 10c.

Subsequently, the temperature of magnetic particle dispersion 11, to which heat has been transferred in heat-absorbing section 12 of heat pump 10c, rises in heat pump and thereafter heat is released to heat-receiving fluid 30 in heat-releasing section 13 of heat pump 10c.

As described above, in the heat pump unit of this exemplary configuration, three heat pumps 10a-10c are arranged such that heat-absorbing section 12 of the heat pump in the succeeding stage receives heat released in heat-releasing section 13 of the heat pump in the preceding stage. In addition, heat-transfer assisting sections 40a, are arranged between three heat pumps 10a-10c to receive heat released in heat-releasing section 13 of the preceding heat pump with secondary working fluid 41 and to give the heat of secondary working fluid 41 to heat-absorbing section 12 of the succeeding heat pump. Thus, the temperature difference between heat to be received from heat-giving fluid 20 and heat to be released to heat-receiving fluid 30 can be further increased, allowing thermal energy to be transferred with a large temperature difference. For example, assuming that each of heat pumps 10a-10c can transfer thermal energy with a temperature difference of 10° C., and that there is no loss between magnetic particle dispersion 11 flowing through the channels of heat pumps 10a-10c and secondary working fluid 41 flowing through the channels of heat-transfer assisting sections 40a, 40b, thermal energy can be transferred with a temperature difference of 30° C.

In this exemplary configuration, the heat pump unit with three-stage structure using three heat pumps 10a-10c is illustrated, but the number of heat pumps is not limited thereto. The greater the number of stages, the further the temperature difference between heat to be received from heat-giving fluid 20 and heat to be released to heat-receiving fluid 30 can be increased.

How much and in which temperature range the magnetocaloric effect causes heat release or heat absorption to occur is specific to each type of magnetic material of magnetic particles 11b, and if they are made of an alloy, it varies in a complex manner depending on the composition of the alloy. For that reason, in the heat pump using the magnetocaloric effect, suitable magnetic materials generally depend on the temperature level to be applied.

Therefore, it is possible that as the magnetic material of magnetic particles 11b in magnetic particle dispersion 11 flowing through the channels of three heat pumps 10a-10c that constitute the heat pump unit shown in FIG. 5, a magnetic material that releases/absorbs large amounts of heat due to the magnetocaloric effect may be individually selected depending on the temperatures of heat to be received in heat-absorbing section 12 and heat to be released in heat-releasing section 13 of heat pumps 10a-10c. For example, assume that each of heat pumps 10a-10c can transfer thermal energy at a temperature difference of 10° C., so that heat is received from heat-giving fluid 20 at 20° C. and released to heat-receiving fluid 30 at 50° C. In such a case, it is possible that as the magnetic material of magnetic particles 11b in magnetic particle dispersion 11 flowing through the channel of heat pump 10a, a magnetic material that releases/absorbs large amounts of heat due to the magnetocaloric effect at 20-30° C. may be selected, that as the magnetic material of magnetic particles 11b in magnetic particle dispersion 11 flowing through the channel of heat pump 10b, a magnetic material that releases/absorbs large amounts of heat due to the magnetocaloric effect at may be selected, and that as the magnetic material of magnetic particles 11b in magnetic particle dispersion 11 flowing through the channel of heat pump 10c, a magnetic material that releases/absorbs large amounts of heat due to the magnetocaloric effect at 40-50° C. may be selected.

Thus, if the magnetic material of magnetic particles 11b in magnetic particle dispersion 11 in each of the multiple stages of heat pumps is individually selected depending on the temperatures of heat to be received in heat-absorbing section 12 and heat to be released in heat-releasing section 13 in each heat pump, the overall thermal efficiency can be improved.

As described above, in the configuration where heat pump 10 shown in FIG. 1 is arranged in multiple stages such that heat-absorbing section 12 of the heat pump in the succeeding stage receives heat released in heat-releasing section 13 of the heat pump in the preceding stage, and where heat-transfer assisting sections 40a, 40 b are arranged between the multiple stages of heat pumps to receive heat released in heat-releasing section 13 of the heat pump in the preceding stage with secondary working fluid 41 and to give the heat of secondary working fluid 41 to heat-absorbing section 12 of the heat pump in the succeeding stage, the heat is transferred between magnetic particle dispersion 11 of heat pumps 10a-10c and secondary working fluid 41 of heat-transfer assisting sections 40a, 40b. In this case, if the heat transfer between magnetic particle dispersion 11 and secondary working fluid 41 occurs not through direct contact with each other, but through the walls of the channels through which they flow, there will be a loss of heat transfer through the walls of the channels. Therefore, the temperature of magnetic particle dispersion 11 must be raised or lowered extra for the temperature difference caused by the loss. The larger this temperature difference, the lower the heat pump efficiency of heat exchange. On the other hand, to transfer heat between magnetic particle dispersion 11 and secondary working fluid 41 through the walls of the channels without reducing the efficiency of heat exchange, the wall materials of the channels must be expensive. In other words, an attempt to transfer heat without bringing magnetic particle dispersion 11 into contact with secondary working fluid 41 involves difficulties in terms of heat exchange efficiency and economy.

A configuration will be described below in which the economy is not compromised and the efficiency of heat exchange is reduced when heat is transferred between magnetic particle dispersion 11 of heat pumps 10a-10c and secondary working fluid 41 of heat-transfer assisting sections 40a, 40b as shown in FIG. 5.

Figure 6:
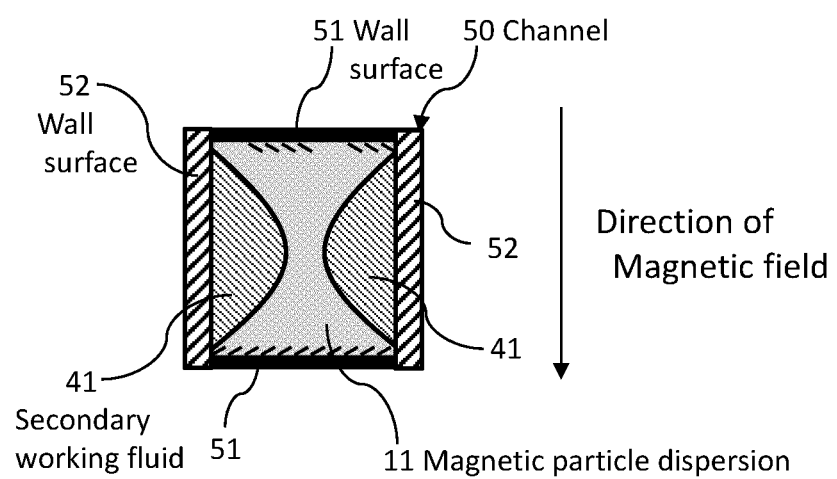
FIG. 6 shows a cross-sectional view of a channel of the heat pump unit shown in FIG. 5, through which the magnetic particle dispersion of the heat pumps and a secondary working fluid of heat-transfer assisting sections flow.

FIG. 6 is a cross-sectional view of the channel of the heat pump unit shown in FIG. 5, through which magnetic particle dispersion 11 of heat pumps 10a-10c and secondary working fluid 41 of heat-transfer assisting sections 40a, 40b flow.

As shown in FIG. 6, magnetic particle dispersion 11 and secondary working fluid 41 are configured to flow through common channel 50 with each other. In this case, if dispersion medium 11a of magnetic particle dispersion 11a is hydrophilic, then a hydrophobic fluid is used as secondary working fluid 41, or if dispersion medium 11a of magnetic particle dispersion 11 is hydrophobic, then a hydrophilic fluid is used as secondary working fluid 41. In other words, magnetic particle dispersion 11 and secondary working fluid 41 are configured such that one of them is hydrophilic and the other is hydrophobic.

Further, for example, in the channel with a square cross section, of two sets of wall surfaces 51, 52, each set facing each other, one set of wall surfaces 51 is processed to produce a magnetic field and/or to have an affinity for the dispersion medium of the magnetic particle dispersion, while the other set of wall surfaces 52 is processed to have an affinity for secondary working fluid 41. When magnetic particle dispersion 11 and secondary working fluid 41 flow through channel 50 processed as described above while a magnetic field is applied in a direction where wall surfaces 51 face each other, magnetic particle dispersion 11 and secondary working fluid 41 flows along wall surfaces 51 and wall surfaces 52, respectively, with being separated from each other, due to the effects of both the magnetic force due to the magnetic field and the surface tension of the fluid, as shown in FIG. 6. In this case, to allow magnetic particle dispersion 11 and secondary working fluid 41 to flow along wall surfaces 51 and wall surfaces 52, respectively, with being separated from each other, the size of the channel must be small enough so that the magnetic force due to the magnetic field and the surface tension of the fluid are dominant over the other forces.

Since magnetic particle dispersion 11 and secondary working fluid 41 are kept separated from each other in the channel, magnetic particle dispersion 11 and secondary working fluid 41 can be easily removed with being separated from each other after the heat exchange between them, as a result of removing magnetic particle dispersion 11 from wall surfaces 51 with high affinity for it and removing secondary working fluid 41 from wall surfaces 52 with high affinity for it.

As described above, since magnetic particle dispersion 11 and secondary working fluid 41 are configured such that one of them is hydrophilic and the other is hydrophobic, magnetic particle dispersion 11 and secondary working fluid 41 can be brought into direct contact with each other inside one channel 50 to perform heat exchange between them. This reduces the heat transfer resistance between magnetic particle dispersion 11 and secondary working fluid 41, allowing efficient heat exchange with a temperature difference as close to "0" as possible. Further, since magnetic particle dispersion 11 and secondary working fluid 41 are configured such that one of them is hydrophilic and the other is hydrophobic, magnetic particle dispersion 11 and secondary working fluid 41 can be easily removed with being separated from each other after the heat exchange between them. In addition, in each of the multiple stages of heat pumps, heat exchange between magnetic particle dispersion 11 and secondary working fluid 41 of the heat-transfer assisting section is performed as described above, which can realize a configuration that reduces as much as possible the loss associated with the temperature difference required for the heat exchange between magnetic particle dispersion 11 and secondary working fluid 41.

REFERENCE SIGNS LIST 10, 10a-10c Heat pump
11 Magnetic particle dispersion
11a Dispersion medium
11b Magnetic particles
11c Heat flux
12 Heat-absorbing section
13 Heat-releasing section
14 Temperature-rising section
15 Temperature-dropping section
16, 42 Pump
17 Magnetic field
20 Heat-giving fluid
30 Heat-receiving fluid
40b Heat-transfer assisting section
41 Secondary working fluid
50 Channel
51, 52 Wall surface

The invention claimed is:

1. A heat pump having a heat-absorbing section that receives heat from an outside and a heat-releasing section that releases heat to the outside, for transferring heat between the heat-absorbing section and the heat-releasing section by reinforcing and reducing a magnetic field applied to a primary working fluid circulating between the heat-absorbing section and the heat-releasing section,
wherein the primary working fluid is a suspension or colloidal fluid containing magnetic particles dispersed in a dispersion medium.

2. The heat pump according to claim 1, comprising:
a temperature-rising section in which the magnetic field applied to the primary working fluid that has passed through the heat-absorbing section is reinforced in an adiabatic environment; and
a temperature-dropping section in which the magnetic field applied to the primary working fluid that has passed through the heat-releasing section is reduced in an adiabatic environment,
wherein the heat-absorbing section holds the primary working fluid that has passed through the temperature-dropping section, with the magnetic field reduced, and
wherein the heat-releasing section holds the primary working fluid that has passed through the temperature-rising section, with the magnetic field reinforced.

3. The heat pump according to claim 1,
wherein a source of the magnetic field is a permanent magnet.

4. A heat pump unit using the heat pump according to claim 1,
wherein the heat pump is arranged in multiple stages such that the heat-absorbing section of the heat pump in a succeeding stage receives heat released in the heat-releasing section of the heat pump in a preceding stage, and
wherein the heat pump unit includes a heat-transfer assisting section that is arranged between the multiple stages of heat pumps and that receives heat released in the heat-releasing section of the heat pump in the preceding stage with a secondary working fluid and then gives the heat of the secondary working fluid to the heat-absorbing section of the heat pump in the succeeding stage.

5. The heat pump unit according to claim 4,
wherein in each of the multiple stages of heat pumps, a magnetic material constituting the primary working fluid is individually selected depending on temperatures of heat to be absorbed in the heat-absorbing section and heat to be released in the heat-releasing section of each heat pump.

6. The heat pump unit according to claim 4,
wherein the secondary working fluid flows through a common channel with the primary working fluid that receives and gives heat, and
wherein one of the primary working fluid and the secondary working fluid that flow through the common channel is hydrophilic and another is hydrophobic.

* * * * *